United States Patent
Kam et al.

(10) Patent No.: US 9,735,415 B2
(45) Date of Patent: Aug. 15, 2017

(54) BATTERY PACK AND PROTECTION METHOD USING THE SAME

(71) Applicant: Samsung SDI Co., Ltd., Yongin-si, Gyeonggi-do (KR)

(72) Inventors: Jae-Woo Kam, Cheonan-si (KR); Hiroaki Takechi, Cheonan-si (KR); Won-Chull Han, Cheonan-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 478 days.

(21) Appl. No.: 14/231,481

(22) Filed: Mar. 31, 2014

(65) Prior Publication Data

US 2015/0130424 A1    May 14, 2015

(30) Foreign Application Priority Data

Nov. 12, 2013   (KR) .................... 10-2013-0137174

(51) Int. Cl.

| | |
|---|---|
| H02J 7/04 | (2006.01) |
| H02J 7/16 | (2006.01) |
| H01M 2/34 | (2006.01) |
| H02J 7/00 | (2006.01) |
| H02H 3/087 | (2006.01) |
| H02H 3/093 | (2006.01) |
| H02H 3/20 | (2006.01) |

(Continued)

(52) U.S. Cl.
CPC ......... *H01M 2/34* (2013.01); *H01M 10/4257* (2013.01); *H02H 3/087* (2013.01); *H02H 3/093* (2013.01); *H02H 3/202* (2013.01); *H02H 7/18* (2013.01); *H02J 7/0031* (2013.01); *H01M 2200/00* (2013.01)

(58) Field of Classification Search
CPC ........................................................ Y02E 60/12
USPC ........................................................... 320/162
See application file for complete search history.

(56) References Cited

U.S. PATENT DOCUMENTS

| | | | | |
|---|---|---|---|---|
| 7,259,477 | B2 * | 8/2007 | Klikic | H02J 9/062 307/14 |
| 2008/0030170 | A1 * | 2/2008 | Dacquay | H02J 7/0004 320/137 |
| 2010/0282200 | A1 | 11/2010 | Notani et al. | |

(Continued)

FOREIGN PATENT DOCUMENTS

| | | |
|---|---|---|
| JP | 2009-068426 A | 4/2009 |
| JP | 2010-285983 A | 12/2010 |
| JP | 2012-36773 A | 2/2012 |

OTHER PUBLICATIONS

English Machine Translation for Japanese Patent No. 2009-068426 A, published on Apr. 2, 2009, 37 pages.

*Primary Examiner* — Suresh Memula
(74) *Attorney, Agent, or Firm* — Lewis Roca Rothgerber Christie LLP

(57) ABSTRACT

A method for protecting batteries with consideration for the influence of a load coupled to a battery pack is provided. The battery pack includes a terminal to be coupled to a capacitor of the load, and a battery management system for controlling a protection operation according to a voltage of the terminal, counting a number of protection operation executions after the load is coupled to the battery pack, and differently controlling a deactivation time of the protection operations depending on whether or not the number of executions is greater than or equal to a reference count.

15 Claims, 3 Drawing Sheets

(51) Int. Cl.
*H02H 7/18* (2006.01)
*H01M 10/42* (2006.01)

(56) References Cited

U.S. PATENT DOCUMENTS

| | | | | |
|---|---|---|---|---|
| 2011/0156649 A1* | 6/2011 | Wu | ....................... | H02J 7/0014 |
| | | | | 320/118 |
| 2011/0234173 A1* | 9/2011 | Kao | ....................... | H02J 7/0073 |
| | | | | 320/150 |
| 2011/0267006 A1* | 11/2011 | Tanno | ................... | H01M 10/44 |
| | | | | 320/116 |
| 2012/0032453 A1 | 2/2012 | Nakamura | | |
| 2013/0002199 A1* | 1/2013 | Hu | ....................... | H02J 7/0004 |
| | | | | 320/112 |
| 2013/0033233 A1* | 2/2013 | Noda | .................... | H01M 10/44 |
| | | | | 320/134 |
| 2014/0300366 A1* | 10/2014 | Kobayakawa | ...... | H01M 10/486 |
| | | | | 324/433 |
| 2015/0048797 A1* | 2/2015 | Song | .................. | G01R 31/3658 |
| | | | | 320/134 |
| 2016/0006278 A1* | 1/2016 | Sakakibara | ........... | H02J 7/0019 |
| | | | | 320/112 |

* cited by examiner

BATTERY PACK AND PROTECTION METHOD USING THE SAME

CROSS-REFERENCE TO RELATED APPLICATION

This application claims priority to and the benefit of Korean Patent Application No. 10-2013-0137174 filed in the Korean Intellectual Property Office on Nov. 12, 2013, the entire content of which is incorporated herein by reference.

BACKGROUND

1. Field

The present invention relates to a battery pack and a protection method of the same.

2. Description of the Related Art

As environmental destruction and resource depletion have become critical issues, there is a growing interest in a system for storing power and making effective use of the stored power.

A power storage system may store generated power of new and renewable energy in a battery, or may store power of a commercial power grid in a battery in association with the commercial power grid.

The power storage system may supply the stored power of the battery to the commercial power grid or a load.

A rechargeable battery capable of charging and discharging may be generally used for the power storage system in order to store power.

The rechargeable battery differs from a primary battery in that it can be repeatedly charged and discharged, while the latter is not designed to be recharged.

The rechargeable battery may be used as a single battery or a battery module in which a plurality of batteries are combined as a single unit, depending on external devices to which it is applied.

In this case, when the battery is connected to a motor-driven device such as an e-bike, the battery repeats a protection operation and a protection deactivation operation under the influence of the motor.

Thus, an additional waiting time for driving the motor is used when the protection deactivation operation is delayed.

The above information disclosed in this Background section is only for enhancement of understanding of the background of the invention and therefore it may contain information that does not form the prior art that is already known to a person of ordinary skill in the art.

SUMMARY

Embodiments according to the present invention provide a battery pack and a method for protecting the same that is capable of effectively protecting batteries in consideration of an influence of a motor driven by the batteries.

Embodiments of the present invention are not limited to the aforementioned features, and other features not mentioned above will be apparently understood by a person of ordinary skill in the art, to which the present invention pertains, from the following description.

A battery pack according to an example embodiment of the present invention includes a terminal to be coupled to a capacitor of a load, and a battery management system (BMS) to control one or more protection operations according to a voltage of the terminal, to count a number of protection operation executions after the load is coupled to the battery pack, and to differently control a deactivation time of the protection operations depending on whether or not the number of executions is greater than or equal to a reference count.

In addition, the BMS of the battery pack according to an example embodiment of the present invention may determine whether or not the battery pack is coupled to the capacitor by the terminal voltage, may repeatedly execute the protection operations for uncoupling the battery pack from the capacitor if the terminal voltage is greater than or equal to a first voltage and then may execute a protection deactivation operation for coupling the battery pack with the capacitor after the protection operations, and may count the number of protection operations since the battery pack is coupled with the capacitor and may execute the protection deactivation operation after a first reference time if the number falls short of the reference count or may execute the protection deactivation operation after a second reference time if the number is greater than or equal to the reference count.

The first reference time of the battery pack according to an example embodiment of the present invention may be greater than the second reference time.

The terminal of the battery pack according to an example embodiment of the present invention may be coupled with a charger which supplies a charging voltage to the battery pack, and the protection operation of the BMS may uncouple the battery pack from the charger if the terminal voltage is greater than or equal to a second voltage while the battery pack is being charged.

A relay including a switch coupling the battery pack according to an example embodiment of the present invention with the capacitor may be further included, and the BMS may execute the protection operations and the protection deactivation operation by controlling a switching operation of the switch.

The BMS of the battery pack according to an example embodiment of the present invention may generate a switch control signal for uncoupling the terminal from the battery pack if the terminal voltage is greater than or equal to the first voltage or the second voltage.

The battery pack according to an example embodiment of the present invention may further include a reference time controller, and the reference time controller may control the first and second reference times.

The battery pack according to an example embodiment of the present invention may further include one or more battery cells.

The load of the battery pack according to an example embodiment of the present invention may include a motor.

A method for protecting a battery pack according to an example embodiment of the present invention includes: measuring a terminal voltage coupled to a capacitor of a load; counting a number of protection operation executions for uncoupling the battery pack from the capacitor if the terminal voltage is greater than or equal to a first voltage; executing the protection operation for uncoupling the battery pack from the capacitor; and executing the protection deactivation operation after a first reference time if the number falls short of the reference count or executing the protection deactivation operation after a second reference time if the number is greater than or equal to the reference count.

In the method for protecting the battery pack according to an example embodiment of the present invention, the first reference time may be longer than the second reference time.

The method for protecting the battery pack according to an example embodiment of the present invention further includes: coupling the battery pack and the capacitor charged with a power source of the battery pack through the terminal; determining whether or not the battery pack is coupled with the capacitor by the terminal voltage; charging the battery pack by coupling the terminal and the charger supplying a charging voltage of the battery pack; and uncoupling the battery pack from the charger if the terminal voltage is greater than or equal to the second voltage while the battery pack is being charged.

The method for protecting the battery pack according to an example embodiment of the present invention may further include a relay including a switch to couple the battery pack with the capacitor, and may control a switching operation of the switch.

The method for protecting the battery pack according to the example embodiment of the present invention may include generating a switch control signal for uncoupling the terminal from the battery pack if the terminal voltage is equal to or greater than the first voltage or the second voltage.

The method for protecting the battery pack according to an example embodiment of the present invention may further include controlling the reference time, and the first and second reference times may be controlled in the controlling of the reference time.

The battery pack and the method using the same according to embodiments of the present invention may effectively protect the batteries in consideration of the influence of the motor driven by the batteries.

DETAILED DESCRIPTION

Figure 1:
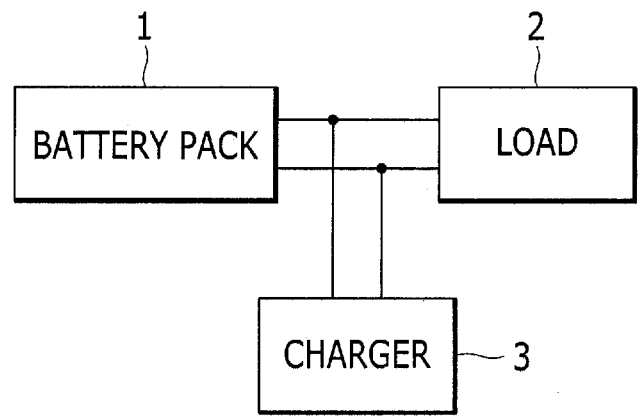
FIG. 1 is a drawing showing a configuration of a load and a charger connected to a battery pack according to an exemplary embodiment

The present invention will be described more fully hereinafter with reference to the accompanying drawings, in which example embodiments of the invention are shown.

As those skilled in the art would realize, the described embodiments may be modified in various different ways, all without departing from the spirit or scope of the present invention.

In addition, the drawings and description are to be regarded as illustrative in nature and are not restrictive. Like reference numerals designate like elements throughout the specification.

Throughout this specification, unless explicitly described to the contrary, the words "comprise", "include" and variations such as "comprises", "comprising", "includes", or "including" will be understood to imply the inclusion of stated elements but not the exclusion of any other elements.

In addition, the terms "-er", "-or", and "module" described in the specification refers to units for processing at least one function and operation and can be implemented by hardware components, software components, firmware components, or any combinations thereof.

FIG. 1 is a drawing showing a configuration of a load and a charger coupled (e.g., connected) to a battery pack according to an example embodiment.

Figure 2:
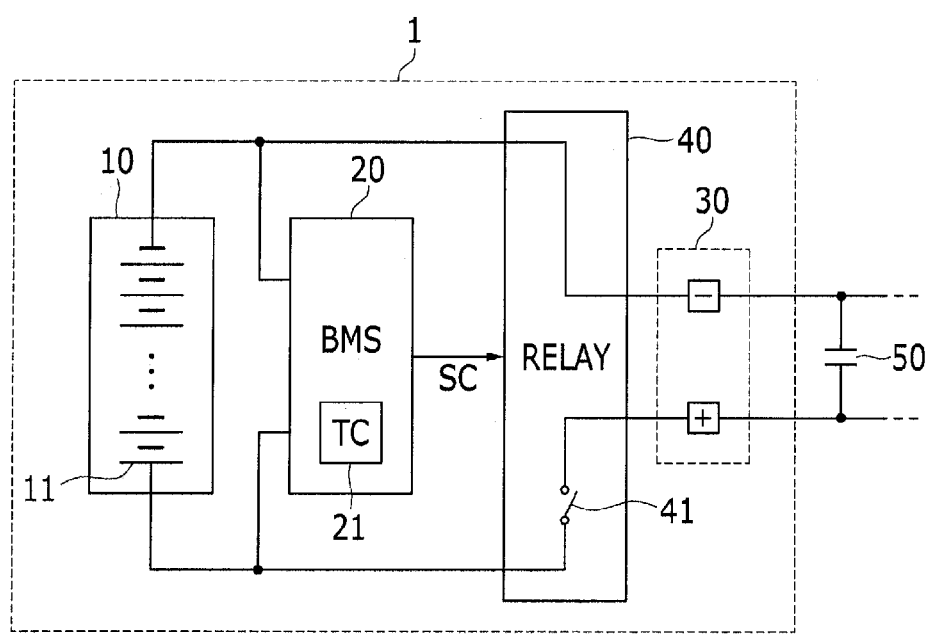
FIG. 2 is a drawing showing a structure of the battery pack according to an exemplary embodiment

FIG. 2 is a drawing showing a structure of the battery pack according to an example embodiment.

The battery pack according to an example embodiment of the present invention will be described hereinafter with reference to FIGS. 1 and 2.

Referring to FIG. 1, the battery pack 1 may be coupled with a load 2 and a charger 3.

A battery 10 in the battery pack 1 may be charged by the charger 3 and discharged by the load 2.

Referring to FIG. 2, the load 2 may be an electric bike (E-bike) including a capacitor 50 charged by a power source of the battery pack 1 and a motor (not shown) driven by the power source stored in the capacitor 50.

The capacitor 50 may be charged with a charging voltage of the battery 10 for initial driving of the motor.

The charger 3 may supply a charging voltage (and charging power) for the battery pack 1.

The battery pack 1 includes the battery 10, and may execute a cut-off operation (hereinafter referred to as a protection operation), which disconnects the battery 10 from the load 2 and the charger 3 when voltage or current of the battery 10 exceeds (e.g., is greater than) a normal range (e.g., a predetermined normal range).

The battery pack 1 may execute a reconnecting (or recoupling) operation (hereinafter referred to as a protection deactivation operation), which reconnects (or recouples) the battery 10 with the load 2 when the voltage or current of the battery pack falls below a normal range (e.g., predetermined normal range) after the protection operation is executed and a first reference time has elapsed.

The battery pack 1 may infinitely (e.g., continuously or unceasingly) execute the protection operation and the protection deactivation operation until the capacitor 50 is fully charged.

The battery pack 1 counts the number of repeated executions of the protection operation and the protection deactivation operation, and may determine that the capacitor 50 is being charged when the number of repeated executions exceeds a reference value (e.g., a predetermined value).

Accordingly, the battery pack 1 may execute the protection deactivation operation after the last protection operation is executed and then a second reference time that is shorter than the first reference time has elapsed.

The battery pack 1 further executes (e.g., quickly executes) the protection activation operation while the capacitor 50 is being charged, thereby reducing a waiting time for the initial driving of the motor.

Referring to FIG. 2, the battery pack 1 according to an example embodiment of the present invention includes the battery 10, a battery management system (BMS) 20, a terminal 30, and a relay 40.

The battery 10 may include at least one or more battery cells 11, and the at least one or more battery cells may be coupled in series or parallel.

The terminal 30 couples the battery 10 with the charger 3 or the load 2, and generates a terminal voltage corresponding to a charging voltage of the battery 10.

The charging voltage of the battery 10 is transferred to the load 2 through the terminal 30, and the battery 10 is charged with the charging voltage of the charger 3.

The relay 40 includes a switch 41 for coupling the battery 10 with the terminal 30, and switching operations of the switch 41 may be controlled by a switching control signal SC of the BMS 20.

The switch 41 may connect (or couple) the battery 10 with the load 2 or the charger 3 or disconnect (or uncouple) the battery 10 from the load 2 or the charger 3 depending on the switching control signal SC.

The BMS 20 determines whether the battery 10 is coupled with the capacitor 50 or the charger 3 by measuring the terminal voltage of the terminal 30.

The BMS 20 executes the protection operation if the terminal voltage exceeds (e.g., is greater than) a first voltage (e.g., a predetermined first voltage).

The BMS 20 may execute the protection deactivation operation after the protection operation is executed and then the first reference time has elapsed.

The BMS 20 counts repeated executions of the protection operation and the protection deactivation operation, and determines whether the protection operation is executed by the charger 3 or by the capacitor 50 charged for driving the motor.

The BMS 20 determines that the protection operation is executed by charging of the capacitor 50 for driving the motor if the repeated executions exceed (e.g., is greater than) a reference count (e.g., a predetermined reference count), and may execute the protection deactivation operation after the last protection operation is executed and then the second reference time has elapsed.

The BMS 20 determines that the protection operation is executed by the charging voltage of the charger 3 if the repeated executions fall short of the reference count (e.g., predetermined reference count), and executes the protection operation if the terminal voltage exceeds a second voltage (e.g., a predetermined second voltage).

The BMS 20 may generate the switching control signal SC for opening the switch 41 so as to disconnect (or uncouple) the battery 10 from the load 2 or the charger 3 when executing the protection operation.

The BMS 20 may generate the switching control signal SC for closing the switch 41 to connect (or couple) the battery 10 with the load 2 or the charger 3 when executing the protection deactivation operation.

The BMS 20 may further include a time controller (TC) 21, and the time controller may adjust the first and second reference times.

Figure 3:
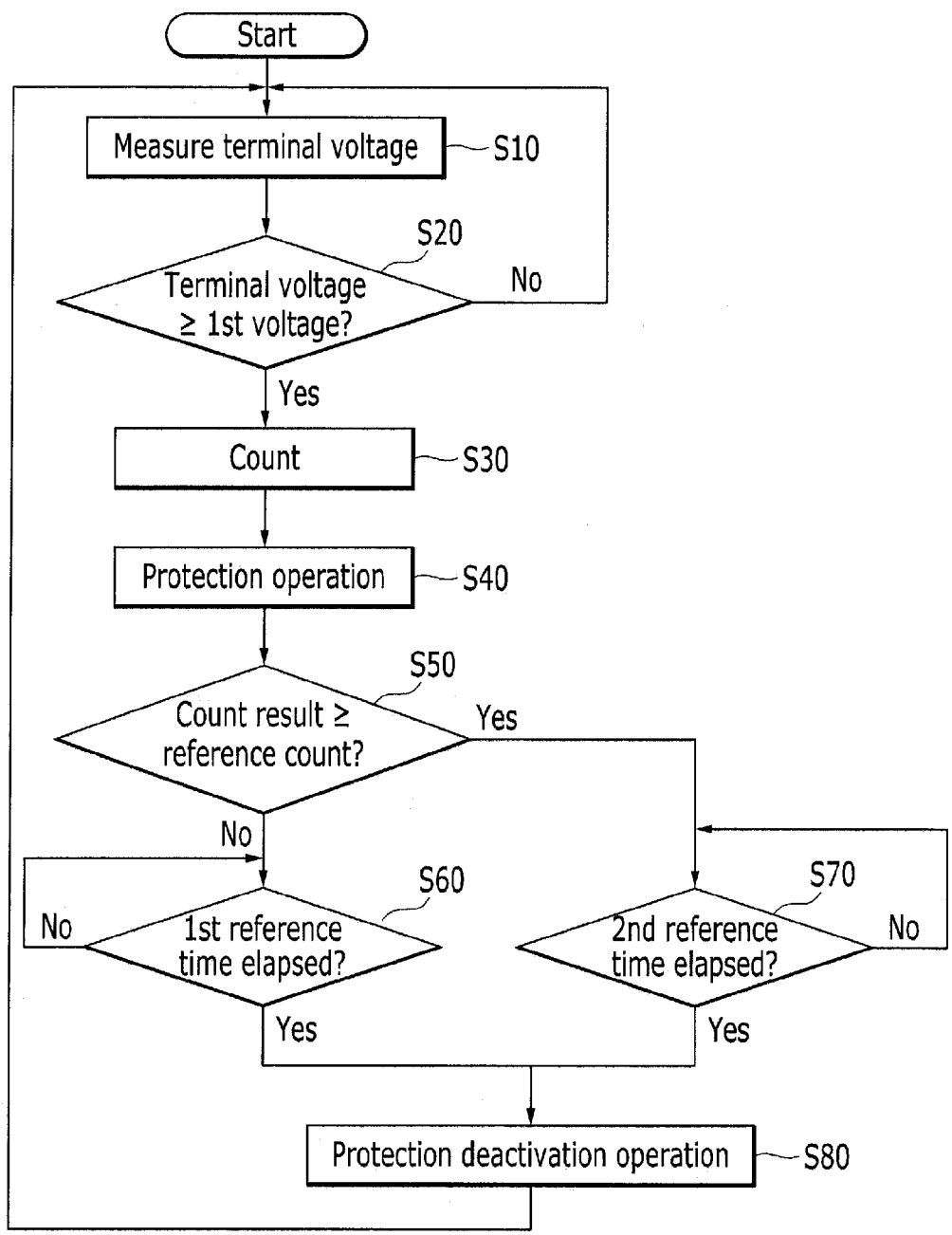
FIG. 3 is a flowchart showing a method for protecting the battery pack according to an exemplary embodiment.

The FIG. 3 is a flowchart showing a method for protecting the battery pack according to an example embodiment of the present invention.

The method for protecting the battery pack according to an exemplary embodiment of the present invention will be described with reference to FIG. 3.

Referring to FIG. 3, the battery pack 1 is connected (or coupled) with the load 2 in the measuring of the terminal voltage (S10).

The BMS 20 measures the terminal voltage of the terminal 30, and determines whether the battery 10 is connected (or coupled) to the capacitor 50 or the charger 3 by using the terminal voltage.

The BMS 20 determines whether the terminal voltage is greater than or equal to a first voltage (e.g., a predetermined first voltage) (S20).

If the terminal voltage is greater than or equal to the first voltage, the BMS 20 counts the number of executions of the protection operation (S30).

The BMS 20 isolates the battery 10 by executing the protection operation (S40).

If the count result of the protection operation executions in step S30 equals or exceeds a reference count (e.g., a predetermined reference count) (S50), the BMS 20 determines whether or not the second reference time has elapsed after the protection operation is executed (S70), and executes the protection deactivation operation if the second reference time has elapsed (S80).

In the determining of the count result, if the count result of the protection operation executions falls short of the reference count (e.g., predetermined reference count) (S50), the BMS 20 determines whether or not the first reference time has elapsed after the protection operation is executed (S60), and executes the protection deactivation operation if the first reference time has elapsed (S80).

While this invention has been described in connection with what is presently considered to be practical example embodiments, it is to be understood that the invention is not limited to the disclosed embodiments, but those skilled in the art may suggest other example embodiments by adding, modifying, or deleting components within the spirit and scope of the appended claims or their equivalents, and the another exemplary embodiment also falls into the scope of the present invention.

DESCRIPTION OF SOME OF THE REFERENCE CHARACTERS

1: battery pack
2: load
3: charger
10: battery
20: BMS
30: terminal
40: relay
50: capacitor

What is claimed is:

1. A battery pack to be coupled to a load, wherein the battery pack comprises:
   a terminal to be coupled to a capacitor of the load; and
   a battery management system (BMS) configured:
      to control one or more protection operations according to a voltage of the terminal;
      to count a number of protection operation executions after the load is coupled to the battery pack; and
      to differently control a deactivation time of the protection operations depending on whether or not the number of executions is greater than or equal to a reference count.

2. The battery pack of claim 1, wherein the BMS is to determine whether or not the battery pack is coupled to the capacitor by the terminal voltage, to repeatedly execute the protection operations for uncoupling the battery pack from the capacitor if the terminal voltage is greater than or equal to a first voltage and then to execute a protection deactivation operation for coupling the battery pack with the capacitor after the protection operations, and to count the number of protection operations since the battery pack is coupled with the capacitor and to execute the protection deactivation operation after a first reference time if the number falls short of the reference count or to execute the protection deactivation operation after a second reference time if the number is greater than or equal to the reference count.

3. The battery pack of claim 2, wherein the first reference time is greater than the second reference time.

4. The battery pack of claim 3, wherein the terminal of the battery pack is coupled with a charger which supplies a charging voltage to the battery pack, and the protection operation of the BMS uncouples the battery pack from the charger if the terminal voltage is greater than or equal to a second voltage while the battery pack is being charged.

5. The battery pack of claim 4, further comprising a relay comprising a switch to couple the battery pack with the capacitor, and the BMS is to execute the protection operations and the protection deactivation operation by controlling a switching operation of the switch.

6. The battery pack of claim 5, wherein the BMS is to generate a switch control signal for uncoupling the terminal from the battery pack if the terminal voltage is greater than or equal to the first voltage or the second voltage.

7. The battery pack of claim 6, further comprising a reference time controller, and the reference time controller is to control the first and second reference times.

8. The battery pack of claim 1, wherein the battery pack further comprises one or more battery cells.

9. The battery pack of claim 1, wherein the load comprises a motor.

10. A method for protecting a battery pack, the method comprising:
    measuring a terminal voltage coupled to a capacitor of a load;
    counting a number of protection operation executions for uncoupling the battery pack from the capacitor if the terminal voltage is greater than or equal to a first voltage;
    executing the protection operation for uncoupling the battery pack from the capacitor; and
    executing a protection deactivation operation after a first reference time if the count result falls short of a reference count or executing the protection deactivation operation after a second reference time if the count result is greater than or equal to the reference count.

11. The method of claim 10, wherein the first reference time is greater than the second reference time.

12. The method of claim 11, further comprising:
    coupling the battery pack and the capacitor charged with a power source of the battery pack through a terminal;
    determining whether or not the battery pack is coupled with the capacitor by the terminal voltage;
    charging the battery pack by coupling the terminal and a charger supplying a charging voltage of the battery pack; and
    uncoupling the battery pack from the charger if the terminal voltage is greater than or equal to a second voltage while the battery pack is being charged.

13. The method of claim 12, wherein the battery pack further comprises a relay comprising a switch to couple the battery pack with the capacitor, and is to control a switching operation of the switch.

14. The method of claim 13, further comprising generating a switch control signal for uncoupling the terminal from the battery pack if the terminal voltage is greater than or equal to the first voltage or the second voltage.

15. The method of claim 14, further comprising controlling the reference time, and the first and second reference times are controlled in the controlling of the reference time.

* * * * *